W. D. HARRAH.
Grain Binder.
No. 41,002.  Patented Dec. 22, 1863.
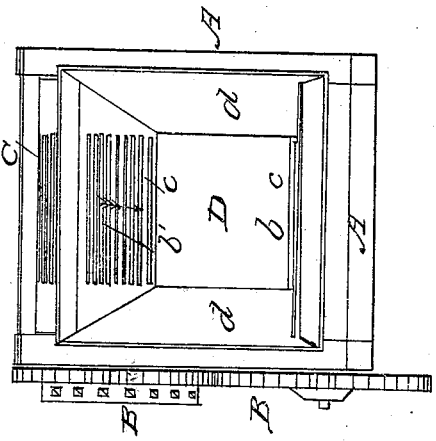
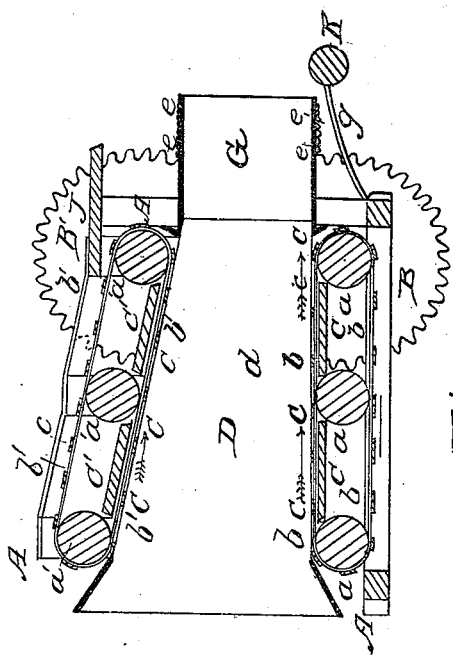
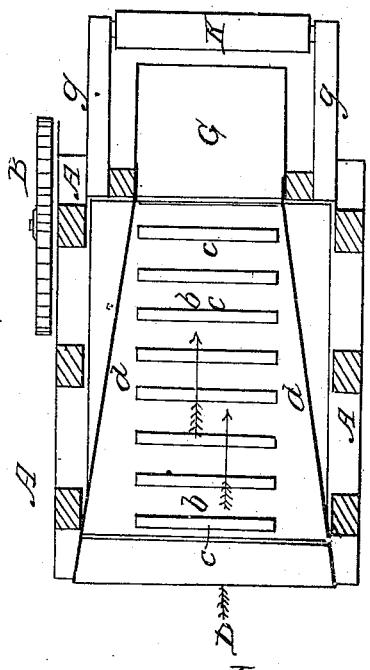
Witnesses:
R. T. Campbell
C. Shafer
Inventor
W. D. Harrah
by his Atty
Mason Fenwick & Lawrence

UNITED STATES PATENT OFFICE.

WILLIAM D. HARRAH, OF DAVENPORT, IOWA, ASSIGNOR TO HIMSELF AND IRA M. GIFFORD, OF SAME PLACE.

IMPROVEMENT IN GRAIN-BINDERS.

Specification forming part of Letters Patent No. 41,002, dated December 22, 1863.

*To all whom it may concern:*

Be it known that I, WILLIAM D. HARRAH, of Davenport, county of Scott, State of Iowa, have invented a new and Improved Machine for Binding Grain; and I do hereby declare that the following is a full, clear, and exact description thereof, reference being had to the accompanying drawings, making a part of this specification, in which—

Figure 1 is a vertical longitudinal section taken through the center of my improved binding-machine. Fig. 2 is a horizontal section of the binder, taken below the upper apron. Fig. 3 is an end view; and Fig. 4 is a perspective view of the band-tube, showing the operation of binding the sheaf as it emerges therefrom.

Similar letters of reference indicate corresponding parts in the several figures.

One of the principal objections to machine grain-binders is, that the mechanism for passing the cord or wire bands around the sheaves and then uniting the ends of these bands is necessarily so complex that it soon becomes deranged and broken, and cannot be readily repaired in the field.

The object of my invention is to apply previously prepared bands, of any suitable material, to the grain while it is compressed into sheaves or handles, and fed through a tube or spout, as will be hereinafter described.

It also has for its object the compression of grain into bundles or sheaves in such manner that a previously prepared band can be readily slipped on them and made to bind them tightly after the compression is removed, thus accomplishing the desired end without the necessity of employing machinery for uniting the ends of the band during the operation of binding—all as will be hereinafter described.

To enable others skilled in the art to make and use my invention, I will proceed to describe its construction and operation.

The frame A consists of several upright timbers, which are mortised into longitudinal sill-pieces and braced in any suitable manner. The posts or uprights each serve as a support for two horizontal transverse rollers, $a$ $a'$, one of which is near the lower end of its post, and the other is near the upper end thereof. The lower series of rollers $a$ $a$ $a$ may be arranged in a horizontal plane, and the axes of the upper series of rollers are arranged in an inclined plane, inclining toward one end of the frame A, as shown in Fig. 1. These rollers, all being of an equal diameter, have wide endless belts or aprons $b$ $b'$ stretched over them, which are provided with narrow cross strips or slats $c$ $c$ $c$, for the purpose of increasing their power of forcing the grain through the machine. These belts $b$ $b'$ are moved in the direction indicated by the arrows in Figs. 1 and 2 by the two rollers, which carry on their ends the twin spur-wheels B B'; and the grain which is introduced at the widest or largest end of the machine is propelled forward by these belts, and gradually compressed into a smaller compass as the distance between the two belts diminishes. To resist the expansion of the grain during its passage between the belts $b$ $b'$, I have applied the boards C C' between each belt and between the rollers $a$ $a'$, in such manner that the inner surfaces of these boards will be in a plane with the peripheries of their respective rollers. These boards will thus serve as a stiff backing for the belts, and prevent the grain from forcing itself upward or downward.

The traveling belts $b$ $b'$ form two sides, top and bottom, of a converging passage or tunnel, D, the sides $d$ $d$ of which may be made of thin plates of metal or of boards, arranged so they will converge toward a cylindrical or other shaped tube or hollow shaft, G, as shown in Figs. 2 and 3. This converging passage D is terminated by this straight tube G, through which the compressed grain from the passage D is forced. The tube G may be made of any desired size (less than the largest opening of passage D) as well as shape. I have represented it square as the most convenient form for receiving the grain from a quadrangular compressing-chamber; but it may be made with a square mouth, terminating in a cylindrical discharge-opening.

The size of the tube G should be such that it will receive over it the bands $e$ $e$ $e$, with which the sheaves are bound, as represented in Fig. 4; and a number of these bands are slipped over this tube G previously to commencing the operation of binding. These bands should fit loosely over the tube G, so that they can be readily slipped off, one at a time, by the operator, whose seat J is represented in Fig. 1.

In front of the band-holding tube G is a roller, K, which has its end bearings on the ends of two curved springs, $g\ g$, which are secured to the sills of the frame A, and project out sufficiently far to support the roller K in such a position that the sheaves of grain emerging from the band-tube will be supported by this roller until they are finally discharged from the machine and fall to the ground.

The machine above described may be attached to the platform of a reaping-machine, and operated by means of endless belts or gearing communicating with the driving-power of the reaper.

The operation of binding the grain with my machine is as follows: As the grain is cut it is raked from the platform of the reaping-machine into the flaring mouth of the passage D, "heads" first, where it is received between the endless belts or carriers $b\ b'$ and drawn toward the contracted tubular passage G, which contains around it a number of prepared bands, which may be made of hemp, wire, or other suitable material, having their ends securely fastened together. As the grain is propelled toward the tube G it is compressed into the required compass for binding, so that when the compressed sheaf has been forced a sufficient distance through the band-tube G, the operator, whose position is on the seat J, with his legs astride the band-tube, slips one of the bands off this tube around the sheaf, which latter expands as the compression is gradually removed from it, and it is firmly held by this band. The sheaves are received upon the roller K as they emerge from the band-tube, which roller supports them until they are forced out of the tube by a succeeding sheaf.

In regard to the diameter of the band-holding tube G, I will state that it may be made to receive around it bands for sheaves which are nine inches in diameter, and will, therefore, bind all the sheaves with the same-sized band. If the sheaf is nine inches it will be bound tightly, and if the sheaf is larger the band will be just so much tighter.

From this description it will be seen that there are only two operations required to bind the grain into sheaves—viz., compressing it and passing it within the compass of the band, and then slipping the bands upon it.

Having thus described my invention, what I claim as new, and desire to secure by Letters Patent, is—

1. Effecting the bundling and binding of grain by compressing the grain, slipping an endless band over the sheaf, and allowing the latter to expand within the band, substantially as described.

2. The combination of a grain compressor and a prepared or endless band, substantially as described.

3. Passing the sheaf of grain within the circle or compass of prepared bands a proper distance, and then slipping the band upon the sheaf, substantially as and for the purposes described.

4. A grain-carrying compressing-chamber, D, constructed and operating substantially as described.

5. The combination of a grain-compressing chamber and a band-holding tube, operating substantially as described.

6. Passing grain in a compressed state through a square, or round, or other shaped tube adapted for holding the bands, and for allowing the same to be readily slipped off over the sheaf, substantially as described.

7. A prepared band-holder, G, or its equivalent, substantially as described.

WM. D. HARRAH.

Witnesses:
  HUGO SCHMIDT,
  AUGUST VIRGIEN.